United States Patent
Kim et al.

(10) Patent No.: US 11,194,194 B2
(45) Date of Patent: Dec. 7, 2021

(54) OPTICAL DEVICE

(71) Applicant: LG Chem, Ltd., Seoul (KR)

(72) Inventors: Jung Woon Kim, Daejeon (KR); Su Young Ryu, Daejeon (KR); Tae Yong Kim, Daejeon (KR); Doo Young Huh, Daejeon (KR); Byoung Kun Jeon, Daejeon (KR); Sang Uk Ryu, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/637,324

(22) PCT Filed: Aug. 29, 2018

(86) PCT No.: PCT/KR2018/009966
§ 371 (c)(1),
(2) Date: Feb. 7, 2020

(87) PCT Pub. No.: WO2019/107709
PCT Pub. Date: Jun. 6, 2019

(65) Prior Publication Data
US 2020/0241338 A1 Jul. 30, 2020

(30) Foreign Application Priority Data
Nov. 28, 2017 (KR) .......... 10-2017-0160762

(51) Int. Cl.
*G02F 1/1339* (2006.01)
*B60R 11/02* (2006.01)
(Continued)

(52) U.S. Cl.
CPC ........ *G02F 1/1339* (2013.01); *B60R 11/0235* (2013.01); *G02F 1/137* (2013.01);
(Continued)

(58) Field of Classification Search
None
See application file for complete search history.

(56) References Cited

U.S. PATENT DOCUMENTS

2005/0068629 A1  3/2005 Fernando et al.
2012/0020056 A1* 1/2012 Yamagata ......... G02F 1/133308
362/97.1
(Continued)

FOREIGN PATENT DOCUMENTS

JP  H01186911 A  7/1989
JP  2004144827 A  5/2004
(Continued)

OTHER PUBLICATIONS

International Search Report for PCT/KR2018/009966 dated Nov. 20, 2018.
(Continued)

*Primary Examiner* — Richard H Kim
(74) *Attorney, Agent, or Firm* — Lerner, David, Littenberg, Krumholz & Mentlik, LLP

(57) ABSTRACT

An optical device is disclosed herein. In some embodiments, an optical device includes an active liquid crystal element, wherein the active liquid crystal element comprises two base layers, an active liquid crystal layer disposed between the two base layers, wherein the active liquid crystal layer includes a liquid crystal compound and is capable of switching between first and second oriented states, and a hard coating layer formed on one of the base layers, wherein the hard coating layer is formed on an active liquid crystal layer-facing surface or an opposite surface of the base layer, and wherein the hard coating layer having a thickness of 2 µm or more. The optical device is capable of varying transmittance, and can be used for various applications such as eyewear, for example, sunglasses or AR (augmented
(Continued)

reality) or VR (virtual reality) eyewear, an outer wall of a building or a vehicle sunroof.

18 Claims, 1 Drawing Sheet

(51) Int. Cl.
  *G02F 1/1335* (2006.01)
  *G02F 1/1337* (2006.01)
  *G02F 1/137* (2006.01)
  *B60R 11/00* (2006.01)

(52) U.S. Cl.
  CPC ...... *G02F 1/1337* (2013.01); *G02F 1/133528* (2013.01); *B60R 2011/0026* (2013.01); *G02F 1/133531* (2021.01); *G02F 2201/50* (2013.01); *G02F 2202/28* (2013.01); *G02F 2203/01* (2013.01)

(56) References Cited

U.S. PATENT DOCUMENTS

| | | |
|---|---|---|
| 2013/0258266 A1 | 10/2013 | Sukhomlinova et al. |
| 2015/0275028 A1* | 10/2015 | Tamura ............... C09D 4/00 427/386 |
| 2016/0041425 A1* | 2/2016 | Oh ................. G02F 1/133528 349/12 |
| 2016/0161800 A1 | 6/2016 | Sekiguchi et al. |
| 2016/0161801 A1* | 6/2016 | Watano ................. G02B 5/201 349/71 |
| 2016/0209552 A1 | 7/2016 | Satake et al. |
| 2017/0253746 A1* | 9/2017 | Lim .................... C09D 4/00 |
| 2018/0196169 A1* | 7/2018 | Choi .................... C08J 5/18 |
| 2018/0239199 A1* | 8/2018 | Osato ............ G02F 1/133514 |
| 2018/0284536 A1 | 10/2018 | Lee et al. |
| 2019/0169388 A1* | 6/2019 | Kim .................... G02B 1/04 |
| 2019/0235301 A1 | 8/2019 | Park et al. |
| 2020/0140615 A1* | 5/2020 | Auman ................. C08J 5/18 |

FOREIGN PATENT DOCUMENTS

| | | |
|---|---|---|
| JP | 2008023854 A | 2/2008 |
| JP | 2015069071 A | 4/2015 |
| JP | 2017049584 A | 3/2017 |
| JP | 2017122808 A | 7/2017 |
| JP | 2017194600 A | 10/2017 |
| KR | 20060087600 A | 8/2006 |
| KR | 20080073252 A | 8/2008 |
| KR | 101612228 B1 | 4/2016 |
| KR | 20170003266 A | 1/2017 |
| KR | 20170047972 A | 5/2017 |
| KR | 101756506 B1 | 7/2017 |
| WO | 2015037568 A1 | 3/2015 |
| WO | 2015046225 A1 | 4/2015 |

OTHER PUBLICATIONS

Extended European Search Report including Written Opinion for Application No. EP18883306.5 dated Dec. 23, 2020, 9 pages.
Kim et al., "Measurement of hardness and friction properties of pencil leads for quantification of pencil hardness test", Advances in Applied Ceramics: Structural Functional Andbioceramics, Published Online May 20, 2016, vol. 115, No. 8, pp. 443-448.

* cited by examiner

[Figure 1]
| 10 |
|---|
| 20 |
[Figure 2]
| 110 |
|---|
| 120 |
| 201 |
| 110 |
[Figure 3]
| 30 |
|---|
| 10 |
| 20 |
| 30 |
[Figure 4]
| 30 | |
|---|---|
| 40 | 10 |
| | 20 |
| 30 | |
[Figure 5]

OPTICAL DEVICE

CROSS-REFERENCE TO RELATED APPLICATION(S)

The present application is a national phase entry under 35 U.S.C. § 371 of International Application No. PCT/KR2018/009966, filed on Aug. 29, 2018, which claims priority from Korean Patent Application No. 10-2017-0160762, filed on Nov. 28, 2017, the disclosures of which are incorporated herein by reference.

TECHNICAL FIELD

The present application relates to an optical device.

BACKGROUND ART

Various optical devices are known, which are designed so that transmittance can be varied using liquid crystal compounds.

For example, variable transmittance devices using a so-called GH cell (guest host cell), to which a mixture of a host material and a dichroic dye guest is applied, are known. A liquid crystal compound is mainly used as the host material of the device.

Such variable transmittance devices are applied to various applications including eyewear such as sunglasses and eyeglasses, outward walls of a building or sunroofs of a vehicle, and the like.

BRIEF DESCRIPTION OF DRAWINGS

FIGS. 1 to 4 are illustrative drawings for explaining an optical device of the present application.

FIG. 5 is exemplary SEM images showing a case where light leakage occurs according to a serial test light leakage evaluation (test C).

DISCLOSURE

Technical Problem

The present application provides an optical device. It is one object of the present application to provide an optical device having a structure capable of preventing defects such as light leakage and cracks in an optical device having a structure in which an optical modulation layer such as an active liquid crystal element or a polarizer is encapsulated by an adhesive film.

Technical Solution

The present application is an optical device capable of adjusting transmittance, which relates to, for example, an optical device capable of switching at least between a transparent mode and a black mode.

The transparent mode is a state where the optical device exhibits a relatively high transmittance, and the black mode is a state where the optical device exhibits a relatively low transmittance.

In one example, the optical device may have a transmittance in the transparent mode of about 30% or more, about 35% or more, about 40% or more, about 45% or more, or about 50% or more. Also, the optical device may have a transmittance in the black mode of about 20% or less, about 15% or less, or about 10% or less.

The higher the transmittance in the transparent mode is, the more advantageous it is, and the lower the transmittance in the black mode is, the more advantageous it is, so that each of the upper limit and the lower limit is not particularly limited. In one example, the upper limit of the transmittance in the transparent mode may be about 100%, about 95%, about 90%, about 85%, about 80%, about 75%, about 70%, about 65% or about 60%. The lower limit of the transmittance in the black mode may be about 0%, about 1%, about 2%, about 3%, about 4%, about 5%, about 6%, about 7%, about 8%, about 9%, or about 10%.

The transmittance may be a linear light transmittance. The term linear light transmittance may be a ratio of, relative to light which is incident on the optical device in a predetermined direction, light (linear light) transmitted through the optical device in the same direction as the incident direction. In one example, the transmittance may be a result of measurement (normal light transmittance) with respect to light incident in a direction parallel to the surface normal of the optical device.

In the optical device of the present application, the light whose transmittance is controlled may be UV-A region ultraviolet light, visible light or near-infrared light. According to a commonly used definition, the UV-A region ultraviolet light is used to mean radiation having a wavelength in a range of 320 nm to 380 nm, the visible light is used to mean radiation having a wavelength in a range of 380 nm to 780 nm and the near-infrared light is used to mean radiation having a wavelength in a range of 780 nm to 2000 nm.

The optical device of the present application is designed to be capable of switching at least between the transparent mode and the black mode. If desired, the optical device may also be designed to be capable of implementing, another mode other than the transparent mode and the black mode, for example, a third mode which may represent any transmittance between the transmittance of the transparent mode and the transmittance of the black mode.

The switching between such modes can be achieved, as the optical device comprises an active liquid crystal element. Here, the active liquid crystal element is a liquid crystal element comprising an active liquid crystal layer capable of switching between at least two or more oriented states of light axes, for example, first and second oriented states, where the active liquid crystal layer comprises a liquid crystal compound capable of switching in an oriented state. Here, the optical axis may mean the long axis direction when the liquid crystal compound included in the liquid crystal element is a rod type, and may mean the normal direction of the disc plane when it is a discotic type. For example, in the case where the liquid crystal element comprises a plurality of liquid crystal compounds whose directions of the optical axes are different from each other in any oriented state, the optical axis of the liquid crystal element may be defined as an average optical axis, and in this case, the average optical axis may mean the vector sum of the optical axes of the liquid crystal compounds.

The oriented state in such a liquid crystal element can be changed by applying energy, for example, by applying a voltage. For example, the liquid crystal element may have any one of the first and second oriented states in a state without voltage application, and may be switched to another oriented state when a voltage is applied.

The black mode may be implemented in any one of the first and second oriented states, and the transparent mode may be implemented in another oriented state. For convenience, it is described herein that the black mode is implemented in the first state.

The liquid crystal element may comprise an active liquid crystal layer containing at least a liquid crystal compound. In one example, the liquid crystal layer is a so-called guest host liquid crystal layer, which may be a liquid crystal layer comprising an active liquid crystal compound and a dichroic dye guest. The term active liquid crystal layer means a liquid crystal layer designed so that the orientation of the optical axis of the contained liquid crystal compound can be changed.

The liquid crystal layer is a liquid crystal layer using a so-called guest host effect, which is a liquid crystal layer in which the dichroic dye guest is aligned according to a alignment direction of the liquid crystal compound (hereinafter, may be referred to as a liquid crystal host). The alignment direction of the liquid crystal host may be adjusted depending on whether or not external energy is applied.

The type of the liquid crystal host used in the liquid crystal layer is not particularly limited, and a general type of liquid crystal compound applied to realize the guest host effect may be used.

For example, as the liquid crystal host, a smectic liquid crystal compound, a nematic liquid crystal compound, or a cholesteric liquid crystal compound may be used. In general, a nematic liquid crystal compound may be used. The term nematic liquid crystal compound means a liquid crystal compound which has no regularity with respect to the position of the liquid crystal molecules but is capable of arranging all of them in the molecular axis direction, and such a liquid crystal compound may be in a rod form or may be in a discotic form.

As such a nematic liquid crystal compound, one having a clearing point of, for example, about 40° C. or more, about 50° C. or more, about 60° C. or more, about 70° C. or more, about 80° C. or more, about 90° C. or more, about 100° C. or more, or about 110° C. or more, or having a phase transition point in the above range, that is, a phase transition point to an isotropic phase on a nematic phase, can be selected. In one example, the clearing point or phase transition point may be about 160° C. or less, about 150° C. or less, or about 140° C. or less.

The liquid crystal compound may have dielectric constant anisotropy of a negative number or a positive number. The absolute value of the dielectric constant anisotropy can be appropriately selected in consideration of the object. For example, the dielectric constant anisotropy may be more than 3 or more than 7, or may be less than −2 or less than −3.

The liquid crystal compound may also have optical anisotropy (n) of about 0.01 or more, or about 0.04 or more. In another example, the optical anisotropy of the liquid crystal compound may be about 0.3 or less, or about 0.27 or less.

Liquid crystal compounds that can be used as the liquid crystal host of the guest host liquid crystal layer are well known to those skilled in the art, whereby the liquid crystal compound can be freely selected from them.

The liquid crystal layer comprises a dichroic dye guest together with the liquid crystal host. The term "dye" may mean a material capable of intensively absorbing and/or modifying light in at least a part or the entire range in a visible light region, for example, a wavelength range of 380 nm to 780 nm, and the term "dichroic dye guest" may mean a material capable of absorbing light in at least a part or the entire range of the visible light region.

As the dichroic dye guest, for example, known dyes known to have properties that can be aligned according to the oriented state of the liquid crystal host may be selected and used. For example, azo dyes or anthraquinone dyes and the like may be used as the dichroic dye guest, and the liquid crystal layer may also comprise one or two or more dyes in order to achieve light absorption in a wide wavelength range.

A dichroic ratio of the dichroic dye guest can be appropriately selected in consideration of the purpose of using the dichroic dye guest. For example, the dichroic dye guest may have a dichroic ratio of 5 or more to 20 or less. For example, in the case of a p-type dye, the term "dichroic ratio" may mean a value obtained by dividing absorption of polarized light parallel to the long axis direction of the dye by absorption of polarized light parallel to the direction perpendicular to the long axis direction. The dichroic dye guest may have the dichroic ratio in at least any one wavelength, a certain range of wavelengths, or the full range of wavelengths in the wavelength range of the visible light region, for example, in the wavelength range of about 380 nm to 780 nm or about 400 nm to 700 nm.

The content of the dichroic dye guest in the liquid crystal layer may be appropriately selected in consideration of the purpose of using the dichroic dye guest. For example, the content of the dichroic dye guest may be selected in a range of about 0.1 wt % to about 10 wt % based on the total weight of the liquid crystal host and the dichroic dye guest. The ratio of the dichroic dye guest may be changed in consideration of the transmittance of the liquid crystal element and the solubility of the dichroic dye in the liquid crystal host, and the like.

The liquid crystal layer basically comprises the liquid crystal host and the dichroic dye guest, and may further comprise other optional additives according to a known form, if necessary. As an example of the additive, a chiral dopant or a stabilizer can be exemplified, without being limited thereto.

The liquid crystal layer may have an anisotropy degree (R) of about 0.5 or more. The anisotropy degree (R) is determined from absorbance (E(p)) of a light beam polarized parallel to the alignment direction of the liquid crystal host and absorbance (E(s)) of a light beam polarized perpendicularly to the alignment direction of the liquid crystal host according to the following equation.

<Anisotropy Degree Equation>

$$\text{Anisotropy degree } (R)=[E(p)-E(s)]/[E(p)+2*E(s)]$$

The above-used reference is another identical apparatus that does not contain a dye in the liquid crystal layer.

Specifically, the anisotropy degree (R) may be determined from the value (E(p)) for the absorbance of the liquid crystal layer in which the dye molecules are horizontally oriented and the value (E(s)) for the absorbance of the same liquid crystal layer in which the dye molecules are vertically oriented. The absorbance is measured in comparison with a liquid crystal layer which does not contain any dye at all but has the same constitution. This measurement may be performed, in the case of one vibration plane, using a polarized beam vibrating in a direction parallel to the alignment direction (E(p)) and vibrating in a direction perpendicular to the alignment direction (E(s)) in subsequent measurements. The liquid crystal layer is not switched or rotated during the measurement, and thus the measurement of E(p) and E(s) may be performed by rotating the vibration plane of the polarized incident light.

One example of a detailed procedure is as described below. The spectra for the measurement of E(p) and E(s) can be recorded using a spectrometer such as a Lambda 1050

UV spectrometer from Perkin Elmer Co. The spectrometer is equipped with Glan-Thompson polarizers for a wavelength range of 250 nm to 2500 nm in both of the measuring beam and the reference beam. The two polarizers are controlled by a stepping motor and are oriented in the same direction. The change in the polarizer direction of the polarizer, for example, the conversion of 0 degrees to 90 degrees, is always performed synchronously and in the same direction with respect to the measuring beam and the reference beam. The orientation of the individual polarizers may be measured using the method described in T. Karstens' 1973 thesis in the University of Wurzburg.

In this method, the polarizer is rotated stepwise by 5 degrees with respect to the oriented dichroic sample, and the absorbance is recorded, for example, at a fixed wavelength in the maximum absorption region. A new zero line is executed for each polarizer position. For the measurement of two dichroic spectra E(p) and E(s), anti-parallel-rubbed test cells coated with polyimide AL-1054 from JSR are located in the measuring beam and the reference beam. Two test cells can be selected with the same layer thickness. The test cell containing a pure host (liquid crystal compound) is placed in the reference beam. The test cell containing a solution of a dye in the liquid crystals is placed in the measuring beam. Two test cells for the measuring beam and the reference beam are installed in a ray path in the same alignment direction. In order to ensure the maximum possible accuracy of the spectrometer, E(p) may be in its maximum absorption wavelength range, for example, a wavelength range of about 0.5 to about 1.5. This corresponds to transmittance of 30% to 5%. This is set by correspondingly adjusting the layer thickness and/or the dye concentration.

The anisotropy degree (R) can be calculated from the measured values of E(p) and E(s) according to the above equation as shown in a reference [see: "Polarized Light in Optics and Spectroscopy," D. S. Kliger et al., Academic Press, 1990].

In another example, the anisotropy degree (R) may be about 0.55 or more, 0.6 or more, or about 0.65 or more. The anisotropy degree (R) may be, for example, about 0.9 or less, about 0.85 or less, about 0.8 or less, about 0.75 or less, or about 0.7 or less.

Such an anisotropy degree (R) can be achieved by controlling the kind of the liquid crystal layer, for example, the kind of the liquid crystal compound (host), the kind and the ratio of the dichroic dye guest, or the thickness of the liquid crystal layer, and the like.

It is possible to provide an optical device with high contrast ratio by increasing the difference in the transmittance between the transparent state and the black state while using lower energy through the anisotropy degree (R) in the above range.

The thickness of the liquid crystal layer may be appropriately selected in consideration of, for example, the desired anisotropy degree or the like. In one example, the thickness of the liquid crystal layer may be about 0.01 µm or more, 0.05 µm or more, 0.1 µm or more, 0.5 µm or more, 1 µm or more, 1.5 µm or more, 2 µm or more, 2.5 µm or more, 3 µm or more, 3.5 µm or more, 4 µm or more, 4.5 µm or more, 5 µm or more, 5.5 µm or more, 6 µm or more, 6.5 µm or more, 7 µm or more, 7.5 µm or more, 8 µm or more, 8.5 µm or more, 9 µm or more, or about 9.5 µm or more. By controlling the thickness in this manner, it is possible to realize an optical device having a large difference in transmittance between the transparent state and the black state, that is, a device having a large contrast ratio. The thicker the thickness is, the higher the contrast ratio can be realized, and thus it is not particularly limited, but it may be generally about 30 µm or less, 25 µm or less, 20 µm or less, or about 15 µm or less.

In one example, the first and second oriented states may be each selected from a horizontal orientation, vertical orientation, twisted nematic orientation, or cholesteric orientation state. For example, in the black mode, the liquid crystal element or the liquid crystal layer may be at least in horizontal orientation, twisted nematic orientation or cholesteric orientation, and in the transparent mode, the liquid crystal element or liquid crystal layer may be in a vertically oriented state, or a horizontally oriented state having optical axes of directions different from the horizontal orientation of the black mode. The liquid crystal element may be an element of a normally black mode in which the black mode is implemented in a state where a voltage is not applied, or may implement a normally transparent mode in which the transparent mode is implemented in a state where a voltage is not applied.

A method of confirming which direction the optical axis of the liquid crystal layer is formed in the oriented state of the liquid crystal layer is known. For example, the direction of the optical axis of the liquid crystal layer can be measured by using another polarizing plate whose optical axis direction is known, which can be measured using a known measuring instrument, for example, a polarimeter such as Pascal 2000 from Jasco.

A method of realizing the liquid crystal element of the normally transparent or black mode by adjusting the dielectric constant anisotropy of the liquid crystal host, the alignment direction of the alignment film for orienting the liquid crystal host or the like is known.

The liquid crystal element may comprise two base layers disposed opposite to each other and the active liquid crystal layer existing between the two base layers.

The liquid crystal element may further comprise spacers for maintaining an interval of the two base layers between the two base layers and/or a sealant for attaching the base layers in a state where the interval of two base layers disposed opposite to each other is maintained. As the spacer and/or the sealant, a known material can be used without any particular limitation.

As the base layer, for example, an inorganic film made of glass or the like, or a plastic film can be used. As the plastic film, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethyleneterephtalate) film; a PI (polyimide) film; a PSF (polysulfone) film; a PAR (polyarylate) film or a fluororesin film and the like can be used, without being limited thereto. A coating layer of gold; silver; or a silicon compound such as silicon dioxide or silicon monoxide, or a functional layer such as an antireflection layer may also be present on the base layer, if necessary.

As the base layer, a film having a phase difference in a predetermined range may be used. In one example, the base layer may have a front phase difference of 100 nm or less. In another example, the front phase difference may be about 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, 15 nm or less, 10 nm or less, 5 nm or less, 4 nm or less, 3 nm or less, 2 nm or less, 1 nm or less, or about 0.5 nm or less. In another example, the front phase difference may be about 0 nm or more, 1 nm or more, 2 nm or more, 3 nm or more, 4 nm or more, 5 nm or more, 6 nm or more, 7 nm or more, 8 nm or more, 9 nm or more, or about 9.5 nm or more.

An absolute value of a thickness direction phase difference of the base layer may be, for example, about 200 nm or less. The absolute value of the thickness direction phase difference may be about 190 nm or less, 180 nm or less, 170 nm or less, 160 nm or less, 150 nm or less, 140 nm or less, 130 nm or less, 120 nm or less, 110 nm or less, 100 nm or less, 90 nm or less, 85 nm or less, 80 nm or less, 70 nm or less, 60 nm or less, 50 nm or less, 40 nm or less, 30 nm or less, 20 nm or less, 10 nm or less, 5 nm or less, 4 nm or less, 3 nm or less, 2 nm or less, 1 nm or less, or about 0.5 nm or less, and may be about 0 nm or more, 10 nm or more, 20 nm or more, 30 nm or more, 40 nm or more, 50 nm or more, 60 nm or more, 70 nm or more, or about 75 nm or more. The thickness direction phase difference may be negative, or may be positive, if the absolute value is within the above range, and for example, may be negative.

In this specification, the front phase difference (Rin) is a numerical value calculated by Equation 1 below, and the thickness direction phase difference (Rth) is a numerical value calculated by Equation 2 below. Unless otherwise specified, the reference wavelength of the front and thickness direction phase differences is about 550 nm.

Front phase difference $(Rin) = d \times (nx - ny)$     [Equation 1]

Thickness direction phase difference $(Rth) = d \times (nz - ny)$     [Equation 2]

In Equations 1 and 2, d is the thickness of the base layer, nx is the refractive index in the slow axis direction of the base layer, ny is the refractive index in the fast axis direction of the base layer, and nz is the refractive index in the thickness direction of the base layer.

When the base layer is optically anisotropic, the angle formed by the slow axes of the base layers disposed opposite to each other may be, for example, in a range of about −10 degrees to about 10 degrees, in a range of about −7 degrees to about 7 degrees, in a range of about −5 degrees to about 5 degrees or in a range of about −3 degrees to about 3 degrees, or may be approximately parallel.

In addition, the angle formed by the slow axis of the base layer and a light absorption axis of a polarizer to be described below may be, for example, in a range of about −10 degrees to about 10 degrees, in a range of about −7 degrees to about 7 degrees, in a range of about −5 degrees to about 5 degrees or in a range of about −3 degrees to about 3 degrees, or may be approximately parallel, or may be in a range of about 80 degrees to about 100 degrees, in a range of about 83 degrees to about 97 degrees, in a range of about 85 degrees to about 95 degrees or in a range of about 87 degrees to about 92 degrees, or may be approximately vertical.

It is possible to realize optically excellent and uniform transparent and black modes through the phase difference adjustment or the arrangement of the slow axes.

The base layer may have a coefficient of thermal expansion of about 100 ppm/K or less. In another example, the coefficient of thermal expansion may be about 95 ppm/K or less, 90 ppm/K or less, 85 ppm/K or less, 80 ppm/K or less, 75 ppm/K or less, 70 ppm/K or less, or about 65 ppm/K or less, or may be about 10 ppm/K or more, 20 ppm/K or more, 30 ppm/K or more, 40 ppm/K or more, 50 ppm/K or more, or about 55 ppm/K or more. For example, the coefficient of thermal expansion of the base layer may be measured in accordance with the provisions of ASTM D696, may be calculated by tailoring the film in the form provided in the relevant standard and measuring the change in length per unit temperature, or may be measured by a known method such as TMA (thermomechanic analysis).

As the base layer, a base layer having an elongation at break of about 90% or more may be used. The elongation at break may be 95% or more, 100% or more, 105% or more, 110% or more, 115% or more, 120% or more, 125% or more, 130% or more, 135% or more, 140% or more, 145% or more, 150% or more, 155% or more, 160% or more, 165% or more, 170% or more, or about 175% or more, and may be about 1,000% or less, 900% or less, 800% or less, 700% or less, 600% or less, 500% or less, 400% or less, 300% or less, or about 200% or less. The elongation at break of the base layer may be measured in accordance with ASTM D882 standard, and may be measured by tailoring the film in the form provided by the corresponding standard and using equipment capable of measuring stress-strain curve (capable of simultaneously measuring force and length).

By selecting the base layer to have such a coefficient of thermal expansion and/or elongation at break, an optical device having excellent durability can be provided.

The thickness of the base layer as above is not particularly limited, and for example, may be in a range of about 50 μm to about 200 μm or so.

Among physical properties mentioned in this specification, when the measured temperature affects the results, the relevant physical properties are physical properties measured at room temperature, unless otherwise specified. The term normal temperature is a natural temperature without warming or cooling, which is usually a temperature of about 10° C. to 30° C., about 23° C. or about 25° C. or so. Also, unless otherwise specified herein, the unit of temperature is ° C.

Among physical properties mentioned in this specification, when the measure pressure affects the results, the relevant physical properties are physical properties measured at normal pressure, unless otherwise specified. The term normal pressure is a natural temperature without being pressurized or depressurized, where usually about 1 atm or so is referred to as normal pressure.

In the present application, a specific hard coating layer is formed on at least one side of the base layer of such an active liquid crystal element. The hard coating layer has a certain range of thicknesses and, if necessary, its hardness and/or elastic modulus can be adjusted to a predetermined range. Due to the presence of such a hard coating layer, the optical device of the present application does not cause defects such as light leakage or cracks even when the active liquid crystal element and/or the polarizer are encapsulated using an adhesive film.

Such a hard coating layer may be formed on any one base layer of two base layer or both of two base layers in the active liquid crystal element, and on the basis of one base layer, it may be formed on both sides or may also be formed on only one side.

In one example, the hard coating layer may be formed at least on the surface of the base layer facing the active liquid crystal layer.

The term hard coating layer is a layer having a predetermined hardness, as generally known in the art, and the specific kind thereof in the present application is not particularly limited.

In one example, a layer having a thickness of about 2 μm or more can be used as the hard coating layer. The desired effect can be achieved by controlling the thickness of such a hard coating layer. The thicker the thickness of the hard coating layer is, the desired cushion or buffer effect can be secured, where the upper limit is not particularly limited, and for example, the thickness of the hard coating layer may be about 20 μm or less, 18 μm or less, 16 μm or less, 14 μm or less, 12 μm or less, 10 μm or less, 8 μm or less, 6 μm or less, 5 μm or less, or about 4 μm or less, and in some cases, may also be about 3 μm or more.

Such a hard coating layer may be designed to have a low hardness and/or elastic modulus, and by this design, the desired cushion or buffer effect can be maximized.

In one example, the hard coating layer may have a hardness of about 0.7 GPa or less. The hardness measurement method of the hard coating layer follows the method of an example to be described below. In another example, the hardness may be about 0.663 GPa or less, 0.65 GPa or less, 0.6 GPa or less, 0.55 GPa or less, or about 0.5 GPa or less. The lower limit of the hardness is not particularly limited, but may be about 0.01 GPa or more, 0.05 GPa or more, 0.1 GPa or more, 0.15 GPa or more, 0.2 GPa or more, or about 0.25 GPa or more, considering the function of the hard coating layer.

The hardness is a result measured using a MTS Nano Indenter XP instrument under conditions of a tip speed of about 10 nm/s and an indentation depth of about 1000 nm.

In one example, the hard coating layer may have an elastic modulus of about 7.5 GPa or less. The elastic modulus measurement method of the hard coating layer follows the method of an example to be described below. In another example, the elastic modulus may be about 7.005 GPa or less, 7 GPa or less, 6.5 GPa or less, 6 GPa or less, 5.5 GPa or less, or about 5.330 GPa or less. The lower limit of the elastic modulus is not particularly limited, but may be about 1 GPa or more, 1.5 GPa or more, 2 GPa or more, 2.5 GPa or more, 3 GPa or more, or about 3.5 GPa or more, considering the function of the hard coating layer.

The elastic modulus is an elastic modulus measured using a MTS Nano Indenter XP instrument under conditions of a tip speed of about 10 nm/s and an indentation depth of about 1000 nm.

The desired effect can be further enhanced by controlling the hardness and/or the elastic modulus as above.

The material of such a hard coating layer is not particularly limited, and it may be prepared by applying general materials known in the art, but adjusting the composition of the material so that the thickness and if necessary, the hardness and/or the elastic modulus fall within the above ranges.

For example, the hard coating layer may comprise polymerized units of a multifunctional (meth)acrylate. Here, the multifunctional (meth)acrylate is a compound having at least two or more (meth)acrylates, which is a material known as a material for the hard coating layer. Generally, the higher the ratio of the multifunctional (meth)acrylate in the hard coating layer, the hardness and the elastic modulus of the layer tend to be higher. In the present application, the term (meth)acrylate means acrylate or methacrylate.

As the multifunctional (meth)acrylate, for example, a difunctional acrylate such as 1,4-butanediol di(meth)acrylate, 1,6-hexanediol di(meth)acrylate, neopentyl glycol di(meth)acrylate, polyethylene glycol di(meth)acrylate, neopentylglycol adipate di(meth)acrylate, hydroxypivalic acid neopentyl glycol di(meth)acrylate, dicyclopentanyl di(meth)acrylate, caprolactone modified dicyclopentenyl di(meth)acrylate, ethylene oxide modified di(meth)acrylate, di(meth)acryloxyethyl isocyanurate, allylated cyclohexyl di(meth)acrylate, tricyclodecanedimethanol (meth)acrylate, dimethyloldicyclopentane di(meth)acrylate, ethylene oxide modified hexahydrophthalic acid di(meth)acrylate, tricyclodecanedimethanol (meth)acrylate, neopentyl glycol modified trimethylpropane di(meth)acrylate, adamantane di(meth)acrylate or 9,9-bis[4-(2-acryloyloxyethoxy)phenyl]fluorene; a trifunctional acrylate such as trimethylolpropane tri(meth)acrylate, dipentaerythritol tri(meth)acrylate, propionic acid modified dipentaerythritol tri(meth)acrylate, pentaerythritol tri(meth)acrylate, propylene oxide modified trimethylolpropane tri(meth)acrylate, trifunctional urethane (meth)acrylate or tris(meth)acryloxyethyl isocyanurate; a tetrafunctional acrylate such as diglycerin tetra(meth)acrylate or pentaerythritol tetra(meth)acrylate; a pentafunctional acrylate such as propionic acid modified dipentaerythritol penta(meth)acrylate; or a hexafunctional acrylate such as dipentaerythritol hexa(meth)acrylate, caprolactone modified dipentaerythritol hexa(meth)acrylate or urethane (meth)acrylate (e.g. a reactant of isocyanate monomer and trimethylolpropane tri(meth)acrylate), and the like can be used, without being limited thereto.

The hard coating layer may further comprise, in addition to the above components, polymerized units of a polymerizable compound known as a so-called urethane acrylate. By using these units appropriately, the desired hardness and/or elastic modulus can be designed.

As the urethane acrylate, those mentioned as the kind of the multifunctional acrylate can be used, or all oligomer components known as a so-called photocuring oligomer and used in the production a pressure-sensitive adhesive composition of a photocuring type such as a UV-curing type in the art can be included. For example, as the oligomer, a urethane acrylate obtained by reacting a polyisocyanate having two or more isocyanate groups in a molecule and a hydroxyalkyl (meth)acrylate; an ester-based acrylate obtained by dehydration condensation reaction of a polyester polyol and a (meth)acrylic acid; an ester-based urethane acrylate obtained by reacting an ester-based urethane resin obtained by reacting a polyester polyol and a polyisocyanate with a hydroxyalkyl acrylate; an ether-based urethane acrylate obtained by reacting an ether-based urethane resin obtained by reacting a polyether polyol and a polyisocyanate with a hydroxyalkyl (meth)acrylate; and the like can be used, without being limited thereto.

The ratio of the urethane acrylate may be selected in consideration of the desired hardness and/or elastic modulus, which is not particularly limited, and for example, may be appropriately selected in a range of about 5 to about 50 parts by weight based on 100 parts by weight of the multifunctional acrylate.

The hard coating layer may further comprise other additives in addition to the above components. The other additives are not particularly limited and may be known additives. In one example, the other additives may be fillers such as silica particles.

The method for forming the hard coating layer is not particularly limited, and the hard coating layer can be formed by a known method. For example, the desired hard coating layer may be formed by compounding a multifunctional (meth)acrylate, a urethane acrylate, an initiator and/or other additives in a solvent, applying the compounded hard coating composition on the above-described base layer and curing it.

The solvent is not particularly limited, and a known solvent capable of forming a hard coating layer can be used. In one example, as the solvent, toluene, cyclohexanone, cyclopentanone, methyl ethyl ketone, dimethylformamide, N-methylpyrrolidone, xylene, butyl cellosolve or propylene glycol methyl ether may be used, without being limited thereto.

On the other hand, the solvent may be included in a ratio in a range of about 60 parts by weight to about 90 parts by weight relative to 100 parts by weight of the hard coating composition. In another example, it may be about 65 parts by weight or more, about 70 parts by weight or more, or about 75 parts by weight or more, and the solvent may be included in a ratio in a range of about 85 parts by weight or less, or about 80 parts by weight or less, relative to 100 parts by weight of the hard coating composition.

In the liquid crystal element, a functional layer such as a conductive layer and/or an alignment film may be further present on one side of the base layer, for example, on the side facing the active liquid crystal layer.

The conductive layer present on the side of the base layer is a constitution for applying a voltage to the active liquid crystal layer, to which a known conductive layer can be applied without any particular limitation. As the conductive layer, for example, a conductive polymer, a conductive metal, a conductive nanowire, or a metal oxide such as ITO (indium tin oxide) can be applied. Examples of the conductive layer that can be applied in the present application are not limited to the above, and a known conductive layer known to be applicable to the liquid crystal element in this field can be used.

In one example, an alignment film exists on the side of the base layer. For example, a conductive layer may first be formed on one side of the base layer, and an alignment film may be formed on its upper part.

The alignment film is a constitution for controlling orientation of the liquid crystal host included in the active liquid crystal layer, and a known alignment film can be applied without particular limitation. As the alignment film known in the industry, there is a rubbing alignment film or a photo alignment film, and the like, and the alignment film that can be used in the present application is the known alignment film, which is not particularly limited.

The alignment direction of the alignment film can be controlled to achieve the orientation of the above-described optical axis. For example, the alignment directions of two alignment films formed on each side of two base layers disposed opposite to each other may form an angle in a range of about −10 degrees to about 10 degrees, an angle in a range of about −7 degrees to about 7 degrees, an angle in a range of about −5 degrees to about 5 degrees or an angle in a range of about −3 degrees to about 3 degrees to each other, or may be approximately parallel to each other. In another example, the alignment directions of the two alignment films may form an angle in a range of about 80 degrees to about 100 degrees, an angle in a range of about 83 degrees to about 97 degrees, an angle in a range of about 85 degrees to about 95 degrees or an angle in a range of about 87 degrees to about 92 degrees, or may be approximately perpendicular to each other.

Since the direction of the optical axis of the active liquid crystal layer is determined in accordance with such an alignment direction, the alignment direction can be confirmed by checking the direction of the optical axis of the active liquid crystal layer.

The shape of the liquid crystal element having such a structure is not particularly limited, which may be determined according to the application of the optical device, and is generally in the form of a film or a sheet.

The optical device may further comprise a polarizer together with the active liquid crystal element. As the polarizer, for example, an absorbing or reflecting linear polarizer, that is, a polarizer having a light absorption axis or a light reflection layer formed in one direction and a light transmission axis formed approximately perpendicular thereto may be used.

Assuming that the blocking state is implemented in the first oriented state of the active liquid crystal layer, the polarizer may be disposed in the optical device such that the angle formed by an average optical axis (vector sum of optical axes) of the first oriented state and the light absorption axis of the polarizer is 80 degrees to 100 degrees or 85 degrees to 95 degrees, or it is approximately perpendicular, or may be disposed in the optical device such that it is 35 degrees to 55 degrees or 40 degrees to 50 degrees or about 45 degrees.

When the alignment direction of the alignment film is used as a reference, the alignment directions of the alignment films formed on each side of the two base layers of the liquid crystal element disposed opposite to each other as described above may form, to each other, an angle in a range of about −10 degrees to about 10 degrees, an angle in a range of about −7 degrees to about 7 degrees, an angle in a range of about −5 degrees to about 5 degrees or an angle in a range of about −3 degrees to about 3 degrees, or in the case of being approximately parallel to each other, the angle formed by the alignment direction of any one of the two alignment films and the light absorption axis of the polarizer may be about 80 degrees to about 100 degrees or about 85 degrees to about 95 degrees, or may be approximately perpendicular.

In another example, the alignment directions of the two alignment films may form an angle in a range of about 80 degrees to about 100 degrees, an angle in a range of about 83 degrees to about 97 degrees, an angle in a range of about 85 degrees to about 95 degrees or an angle in a range of about 87 degrees to about 92 degrees, or in the case of being approximately vertical to each other, the angle formed by the alignment direction of the alignment film disposed closer to the polarizer of the two alignment films and the light absorption axis of the polarizer may be about 80 degrees to about 100 degrees or about 85 degrees to about 95 degrees, or may be approximately perpendicular.

For example, as shown in FIG. 1, the liquid crystal element (10) and the polarizer (20) may be disposed in a state of being laminated on each other such that the optical axis (average optical axis) of the first alignment direction in the liquid crystal element (10) and the light absorption axis of the polarizer (20) become the above relationship.

In one example, when the polarizer (20) is a polarizing coating layer to be described below, a structure in which the polarizing coating layer is present inside the liquid crystal element can be realized. For example, as shown in FIG. 2, a structure in which the polarizing coating layer (201) is present between any one base layer (110) of the base layers (110) of the liquid crystal element and the active liquid crystal layer (120) can be realized. For example, the conductive layer (not shown), the polarizing coating layer (201) and the alignment film (not shown) as described above may be sequentially formed on the base layer (110).

The kind of the polarizer that can be applied in the optical device of the present application is not particularly limited. For example, as the polarizer, a conventional material used in conventional LCDs or the like, such as a PVA (poly(vinyl alcohol)) polarizer, or a polarizer implemented by a coating method such as a polarizing coating layer comprising lyotropic liquid crystals (LLCs) or reactive mesogens (RMs) and a dichroic dye can be used. In this specification, the polarizer implemented by the coating method as described above may be referred to as a polarizing coating layer. As the lyotropic liquid crystal, a known liquid crystal may be used without any particular limitation, and for example, a lyotropic liquid crystal capable of forming a lyotropic liquid crystal layer having a dichroic ratio of about 30 to 40 or so may be used. On the other hand, when the polarizing coating layer contains reactive mesogens (RMs) and a dichroic dye, as the dichroic dye, a linear dye may be used, or a discotic dye may also be used.

The optical device of the present application may comprise only each one of the active liquid crystal element and the polarizer as described above. Thus, the optical device may comprise only one active liquid crystal element and may comprise only one polarizer.

The optical device may further comprise two outer substrates disposed opposite to each other. For example, as shown in FIG. 3, the active liquid crystal element (10) and the polarizer (20) may exist between the two substrates (30) disposed opposite to each other.

As the outer substrate, for example, an inorganic film made of glass or the like, or a plastic film can be used. As the plastic film, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethyleneterephtalate) film; a PI (polyimide) film; a PSF (polysulfone) film; a PAR (polyarylate) film or a fluororesin film and the like can be used, without being limited thereto. A coating layer of gold; silver; or a silicon compound such as silicon dioxide or silicon monoxide, or a functional layer such as an antireflection layer may also be present on the outer substrate, if necessary.

As the outer substrate, a film having a phase difference in a predetermined range may be used. In one example, the outer substrate may have a front phase difference of about 100 nm or less. In another example, the front phase difference may be about 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4 nm or less, 3 nm or less, 2 nm or less, or about 1 nm or less. In another example, the front phase difference may be about 0 nm or more, 1 nm or more, 2 nm or more, 3 nm or more, 4 nm or more, 5 nm or more, 6 nm or more, 7 nm or more, 8 nm or more, 9 nm or more, or about 9.5 nm or more.

An absolute value of a thickness direction phase difference of the outer substrate may be, for example, about 200 nm or less. The absolute value of the thickness direction phase difference may be about 190 nm or less, 180 nm or less, 170 nm or less, 160 nm or less, 150 nm or less, 140 nm or less, 130 nm or less, 120 nm or less, 110 nm or less, 100 nm or less, 90 nm or less, 85 nm or less, 80 nm or less, 70 nm or less, 60 nm or less, 50 nm or less, 40 nm or less, 30 nm or less, 20 nm or less, 15 nm or less, 10 nm or less, 9 nm or less, 8 nm or less, 7 nm or less, 6 nm or less, 5 nm or less, 4 nm or less, 3 nm or less, 2 nm or less, or about 1 nm or less, and may be about 0 nm or more, 5 nm or more, 10 nm or more, 20 nm or more, 30 nm or more, 40 nm or more, 50 nm or more, 60 nm or more, 70 nm or more, or about 75 nm or more. The thickness direction phase difference may be negative, or may be positive, if the absolute value is within the above range, and for example, may be negative.

The front phase difference (Rin) and the thickness direction phase difference (Rth) of the outer substrate may be calculated in the same manner, except that in Equations 1 and 2 above, the thickness (d), the refractive index in the slow axis direction (nx), the refractive index in the fast axis direction (ny) and the refractive index in the thickness direction (nz) of the base layer are substituted with the thickness (d), the refractive index in the slow axis direction (nx), the refractive index in the fast axis direction (ny) and the refractive index in the thickness direction (nz), of the outer substrate, respectively, to calculate them.

When the outer substrate is optically anisotropic, the angle formed by the slow axes of the outer substrates disposed opposite to each other may be, for example, in a range of about −10 degrees to about 10 degrees, in a range of about −7 degrees to about 7 degrees, in a range of about −5 degrees to about 5 degrees or in a range of about −3 degrees to about 3 degrees, or may be approximately parallel.

Also, the angle formed by the slow axis of the outer substrate and, in the case where the above-described base layer is optically anisotropic, the slow axis of the base layer may be, for example, in a range of about −10 degrees to about 10 degrees, in a range of about −7 degrees to about 7 degrees, in a range of about −5 degrees to about 5 degrees or in a range of about −3 degrees to about 3 degrees, or may be approximately parallel, or may be in a range of about 80 degrees to about 100 degrees, in a range of about 83 degrees to about 97 degrees, in a range of about 85 degrees to about 95 degrees or in a range of about 87 degrees to about 92 degrees, or may be approximately vertical.

It is possible to realize optically excellent and uniform transparent and black modes through the phase difference adjustment or the arrangement of the slow axes.

As the outer substrate, a substrate having a coefficient of thermal expansion of about 100 ppm/K or less may be used. In another example, the coefficient of thermal expansion may be about 95 ppm/K or less, 90 ppm/K or less, 85 ppm/K or less, 80 ppm/K or less, 75 ppm/K or less, 70 ppm/K or less, 65 ppm/K or less, 60 ppm/K or less, 50 ppm/K or less, 40 ppm/K or less, 30 ppm/K or less, 20 ppm/K or less, or about 15 ppm/K or less, or may be about 1 ppm/K or more, 2 ppm/K or more, 3 ppm/K or more, 4 ppm/K or more, 5 ppm/K ppm/K or more, 6 ppm/K ppm/K or more, 7 ppm/K ppm/K or more, 8 ppm/K ppm/K or more, 9 ppm/K or more, or about 10 ppm/K or more.

The method of measuring the coefficient of thermal expansion of the outer substrate are the same as the method of measuring the coefficient of thermal expansion of the base layer as described above.

By selecting the outer substrate to have such a coefficient of thermal expansion, an optical device having excellent durability can be provided.

The thickness of the outer substrate as above is not particularly limited, and for example, may be about 0.3 mm or more. In another example, the thickness may be about 0.5 mm or more, 1 mm or more, 1.5 mm or more, or about 2 mm or more or so, and may also be about 10 mm or less, 9 mm or less, 8 mm or less, 7 mm or less, 6 mm or less, 5 mm or less, 4 mm or less, or about 3 mm or less or so.

The optical device may further comprise an adhesive film encapsulating the active liquid crystal element and/or the polarizer in the outer substrates. For example, as shown in FIG. 4, the adhesive film (40) may be present between the outer substrate (30) and the active liquid crystal element (10), between the active liquid crystal element (10) and the polarizer (20) and between the polarizer (20) and the outer substrate (30). Furthermore, the adhesive film may also be present on the sides of the active liquid crystal element and/or the polarizer for encapsulation of the active liquid crystal element and/or the polarizer.

The adhesive film may encapsulate the active liquid crystal element (10) and the polarizer (20) while attaching the outer substrate (30) and the active liquid crystal element (10), the active liquid crystal element (10) and the polarizer (20), and the polarizer (20) and the outer substrate (30) to each other.

For example, after laminating outer substrates, an active liquid crystal element, a polarizer and an adhesive film according to a desired structure, the above structure can be realized by a method of pressing them in a vacuum state.

As the adhesive film, a known material can be used without any particular limitation, and for example, among a known thermoplastic polyurethane adhesive film (TPU), polyamide adhesive film, polyester adhesive film, EVA (ethylene vinyl acetate) adhesive film, polyolefin adhesive film such as polyethylene or polypropylene, and the like, one satisfying physical properties to be described below can be selected.

As the adhesive film, a film having a phase difference in a predetermined range may be used. In one example, the adhesive film may have a front phase difference of about 100 nm or less. In another example, the front phase difference may be about 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4 nm or less, 3 nm or less, 2 nm or less, or about 1 nm or less. The front phase difference may be about 0 nm or more, 1 nm or more, 2 nm or more, 3 nm or more, 4 nm or more, 5 nm or more, 6 nm or more, 7 nm or more, 8 nm or more, 9 nm or more, or about 9.5 nm or more.

An absolute value of the thickness direction phase difference of the adhesive film may be, for example, about 200 nm or less. In another example, the absolute value may be about 190 nm or less, 180 nm or less, 170 nm or less, 160 nm or less, 150 nm or less, 140 nm or less, 130 nm or less, 120 nm or less, or 115 nm or less, or may be 0 nm or more, 10 nm or more, 20 nm or more, 30 nm or more, 40 nm or more, 50 nm or more, 60 nm or more, 70 nm or more, 80 nm or more, or about 90 nm or more. The thickness direction phase difference may be a negative number or a positive number, and for example, may be a negative number, if the absolute value is within the above range.

The front phase difference (Rin) and the thickness direction phase difference (Rth) of the adhesive film may be calculated in the same manner, except that in Equations 1 and 2 above, the thickness (d), the refractive index in the slow axis direction (nx), the refractive index in the fast axis direction (ny) and the refractive index in the thickness direction (nz) of the base layer are substituted with the thickness (d), the refractive index in the slow axis direction (nx), the refractive index in the fast axis direction (ny) and the refractive index in the thickness direction (nz), of the adhesive film, respectively, to calculate them.

Here, the thickness of the adhesive film may be a thickness of the adhesive film between the outer substrate (30) and liquid crystal element (10), such as an interval between the two, a thickness of the adhesive film between liquid crystal element (10) and the polarizer (20), such as an interval between the two, and a thickness of the adhesive film between the polarizer (20) and the outer substrate (30), such as an interval between the two.

As the adhesive film, one having a Young's modulus in a range of about 0.1 to about 100 MPa may be used. The Young's modulus may be measured in accordance with ASTM D882 standard, and may be measured by tailoring the film in the form provided by the corresponding standard and using equipment capable of measuring stress-strain curve (capable of simultaneously measuring force and length).

By selecting the adhesive film to have such a Young's modulus, an optical device with excellent durability can be provided.

The thickness of such an adhesive film is not particularly limited, which may be, for example, in a range of about 200 μm to about 600 μm or so. Here, the thickness of the adhesive film may be a thickness of the adhesive film between the outer substrate (30) and the liquid crystal element (10), such as an interval between the two, a thickness of the adhesive film between the liquid crystal element (10) and the polarizer (20), such as an interval between the two, and a thickness of the adhesive film between the polarizer (20) and the outer substrate (30), such as an interval between the two.

The optical device may further comprise any necessary configuration other than the above configurations, and for example, comprise a known configuration such as a retardation layer, an optical compensation layer, an antireflection layer and a hard coating layer in a proper position.

Such an optical element can be used for various applications, and for example, can be used for eyewear such as sunglasses or AR (augmented reality) or VR (virtual reality) eyewear, an outer wall of a building or a vehicle sunroof, and the like.

In one example, the optical device itself may be a vehicle sunroof.

For example, in a vehicle including a vehicle body on which at least one or more openings are formed, the optical device or a vehicle sunroof mounted on the openings can be mounted and used.

Advantageous Effects

The present application provides an optical device capable of varying transmittance, and such an optical device can be used for various applications such as eyewear, for example, sunglasses or AR (augmented reality) or VR (virtual reality) eyewear, an outer wall of a building or a vehicle sunroof.

MODE FOR INVENTION

Hereinafter, the contents of the present application will be described in detail by way of examples according to the present application and comparative examples, but the contents of the present application are not limited by the following examples and comparative examples.

1. Measurement of Hardness and Elastic Modulus

The hardness and elastic modulus of the hard coating layer were measured at room temperature (about 23° C.) using a MTS Nano Indenter XP instrument under conditions of a tip speed of about 10 nm/s and an indentation depth of about 1,000 nm.

2. 120° C. and 3 Hour Storage Evaluation (Test A)

After an active liquid crystal element produced in an example was kept in an oven of 120° C. for about 3 hours, it was taken out to visually evaluate the occurrence of cracks or the like. As a result of the evaluation, when a defect such as a crack did not occur, it was marked with P and when the defect was observed, it was marked with NG, in Table 1 below.

3. Serial Test Crack Evaluation (Test B)

Using an active liquid crystal element produced in an example, a laminate was produced, in which a glass substrate (ST glass substrate), a urethane adhesive film, a PVA (polyvinyl alcohol) polarizer, a urethane adhesive film, the active liquid crystal element, a urethane adhesive film and a glass substrate (ST glass substrate) were laminated sequentially, and it was set as one cycle to maintain it at 120° C. for 1 hour, 100° C. for 7 days and −40° C. for 90 hours and after the cycle was performed 10 times, the occurrence of cracks was visually evaluated. As a result of the evaluation, when a defect such as a crack did not occur, it was marked with P and when the defect was observed, it was marked with NG, in Table 1 below.

4. Serial Test Light Leakage Evaluation (Test C)

For a sample subjected to the same cycle as the serial test crack evaluation, the occurrence of light leakage was evaluated. The occurrence of light leakage was determined by observing the sample with an electron microscope (Nikon Corporation, LV100ND-POL), and when no light leakage occurred, it was marked with P and when light leakage was generated as FIG. 5, it was marked with NG, in Table 1 below.

Example 1

A. Hard Coating Composition

A hard coating composition was prepared by mixing a solvent (PGME, propylene glycol methyl ether), a multifunctional acrylate (BP302, manufactured by Hannong Chemical Inc.; MIRAMER M340, manufactured by Miwon Specialty Chemical Co., Ltd.), a urethane acrylate (SU530, manufactured by Soltech Ltd.) and a photoinitiator (Irgacure 907, manufactured by BASF) in a weight ratio of 79:8:2:10:1 (PGME: M340: BP302: SU530: Irgacure 907).

B. Active Liquid Crystal Element

Hard coating layer formation: A PC (polycarbonate) film was used as a base layer, and the hard coating composition was applied on one side of each of two PC (polycarbonate) films such that the final thickness was as shown in Table 1 below, dried at a temperature of about 80° C. for about 3 minutes and then irradiated with ultraviolet rays at an exposure amount of about 500 mJ/cm$^2$ and cured to form a hard coating layer.

First base layer on which alignment film was formed: A ball spacer alignment film composition prepared by mixing a solvent (cyclohexanone), a photo-orientational material (5-norbornene-2-methyl-4-methoxycinnamate) and ball spacers (KBN-510, manufactured by SEKISUI, average particle diameter (10 μm)) in a weight ratio of 98:1:1 (solvent: photo-orientational material: spacer) was applied on the hard coating layer formed on one side of one base layer using a mayer bar (#10) to a thickness of about 60 nm, dried at 100° C. for about 2 minutes, and then irradiated with polarized ultraviolet rays at an intensity of 200 mW/cm$^2$ for about 10 seconds to manufacture a first base layer that the spacers were fixed on one side and an alignment film was formed on the hard coating layer.

Second base layer on which alignment film was formed: An alignment film composition prepared by mixing a solvent (cyclohexanone) and a photo-orientational material (5-norbornene-2-methyl-4-methoxycinnamate) in a weight ratio of about 97:3 (solvent: photo-orientational material) was applied to the hard coating layer formed on one side of the other base layer using a mayer bar (#4) to a thickness of about 300 nm, dried at 80° C. for 2 minutes, and then irradiated with polarized ultraviolet rays at an intensity of 200 mW/cm$^2$ for about 10 seconds to manufacture a second base layer that an alignment film was formed on the hard coating layer.

Active liquid crystal element: After a light modulating material (MDA-14-4145, Merck) was applied on the alignment film of the first base layer, the alignment film of the first base layer and the alignment film of the second base layer were laminated so as to face each other, and then fixed with a sealant to manufacture an active liquid crystal element.

Example 2

A hard coating layer was formed in the same manner as in Example 1, except that a hard coating composition prepared by mixing a solvent (PGME, propylene glycol methyl ether), a multifunctional acrylate (BP302, manufactured by Hannong Chemical Inc.; MIRAMER M340, manufactured by Miwon Specialty Chemical Co., Ltd.), a urethane acrylate (SU530, manufactured by Soltech Ltd.), a photoinitiator (Irgacure 907, manufactured by BASF) and silica particles (SEKISUI, 38 nm particle diameter) in a weight ratio of 79:8:2:1:10 (PGME: M340: BP302: SU530: Irgacure907: silica particle), and a first base layer, a second base layer and an active liquid crystal element were manufactured in the same manner as in Example 1.

Example 3

A hard coating layer was formed in the same manner as in Example 1, except that a hard coating composition prepared by mixing a solvent (PGME, propylene glycol methyl ether), a multifunctional acrylate (BP302, manufactured by Hannong Chemical Inc.; MIRAMER M340, manufactured by Miwon Specialty Chemical Co., Ltd.), a urethane acrylate (SU530, manufactured by Soltech Ltd.), a photoinitiator (Irgacure 907, manufactured by BASF) and silica particles (SEKISUI, 38 nm particle diameter) in a weight ratio of 79:12:3:5:1:10 (PGME: M340: BP302: SU530: Irgacure907: silica particle), and a first base layer, a second base layer and an active liquid crystal element were manufactured in the same manner as in Example 1.

Example 4

A hard coating layer was formed in the same manner as in Example 1, except that a hard coating composition prepared by mixing a solvent (PGME, propylene glycol methyl ether), a multifunctional acrylate (BP302, manufactured by Hannong Chemical Inc.; MIRAMER M340, manufactured by Miwon Specialty Chemical Co., Ltd.), a urethane acrylate (SU530, manufactured by Soltech Ltd.), a photoinitiator (Irgacure 907, manufactured by BASF) and silica particles (SEKISUI, 38 nm particle diameter) in a weight ratio of 79:12:3:5:1:20 (PGME: M340: BP302: SU530: Irgacure907: silica particle), and a first base layer, a second base layer and an active liquid crystal element were manufactured in the same manner as in Example 1.

Physical properties and test results of the manufactured hard coating layer or the like are summarized in Table 1 below.

TABLE 1

|  | Hard coating layer | | | Test | | |
| --- | --- | --- | --- | --- | --- | --- |
|  | Thickness (μm) | Harness (GPa) | Elastic modulus (GPa) | Test A | Test B | Test C |
| Example 1 | 2 | 0.282 | 3.870 | P | P | P |
| Example 2 | 2 | 0.399 | 4.900 | P | P | P |
| Example 3 | 2 | 0.468 | 5.162 | P | P | P |
| Example 4 | 2 | 0.582 | 5.930 | P | P | P |

The invention claimed is:

1. An optical device, comprising:
   two outer substrates;
   an adhesive film disposed between the two outer substrates; and
   an active liquid crystal element disposed between the two outer substrates,
   wherein the adhesive film is present between each of the two outer substrates and the active liquid crystal element, wherein the active liquid crystal element comprises:
   two base layers;
   an active liquid crystal layer disposed between the two base layers, wherein the active liquid crystal layer includes a liquid crystal compound and is capable of switching between first and second oriented states; and
   a hard coating layer formed on one of the base layers, wherein the hard coating layer is formed on an active liquid crystal layer-facing surface of the base layer, and wherein the hard coating layer having a thickness of 2 μm or more.

2. The optical device according to claim 1, further comprising:
   a polarizer,
   wherein the active liquid crystal element and the polarizer are sequentially disposed between the two outer substrates,
   wherein the adhesive film is present between the active liquid crystal element and the polarizer, between the polarizer and each of the two outer substrates, and on the sides of the active liquid crystal element and the polarizer, and
   the active liquid crystal element and the polarizer are encapsulated by the adhesive film between the two outer substrates.

3. The optical device according to claim 2, wherein the active liquid crystal element and the polarizer are disposed such that the angle formed by an average optical axis of the first oriented state of the active liquid crystal layer and the light absorption axis of the polarizer is in a range of 80 degrees to 100 degrees or 35 degrees to 55 degrees.

4. The optical device according to claim 2, further comprising:
   two alignment films, wherein each alignment film is formed on the surfaces of the two base layers facing the active liquid crystal layer.

5. The optical device according to claim 4, wherein an angle formed by the alignment directions of the two alignment films of the two base layers is in a range of −10 degrees to 10 degrees or in a range of 80 degrees to 100 degrees.

6. The optical device according to claim 4, wherein an angle formed by the alignment direction of the alignment film formed on the base layer closer to the polarizer and the light absorption axis of the polarizer is in a range of 80 degrees to 100 degrees.

7. The optical device according to claim 2, wherein the adhesive film has an absolute value of a thickness direction phase difference of 200 nm or less.

8. The optical device according to claim 1, wherein the hard coating layer has a hardness of 0.7 GPa or less.

9. The optical device according to claim 1, wherein the hard coating layer has an elastic modulus of 7.5 GPa or less.

10. The optical device according to claim 1, wherein the hard coating layer comprises polymerized units of a multifunctional (meth)acrylate.

11. The optical device according to claim 1, wherein the two base layers have a front phase difference of 100 nm or less.

12. The optical device according to claim 1, wherein the two base layers have an absolute value of a thickness direction phase difference of 200 nm or less.

13. The optical device according to claim 1, wherein the two base layers have a coefficient of thermal expansion of 100 ppm/K or less.

14. The optical device according to claim 1, wherein the two base layers have an elongation at break of 100% or more.

15. The optical device according to claim 1, wherein the outer substrates have a front phase difference of 100 nm or less.

16. The optical device according to claim 1, wherein the outer substrates have an absolute value of a thickness direction phase difference of 200 nm or less.

17. The optical device according to claim 1, wherein the outer substrates have a coefficient of thermal expansion of 100 ppm/K or less.

18. A vehicle, comprising:
   a vehicle body on which one or more openings are formed; and
   the optical device of claim 1 mounted on the one or more openings.

* * * * *